United States Patent
Im et al.

(10) Patent No.: US 7,397,213 B2
(45) Date of Patent: Jul. 8, 2008

(54) MOBILE ROBOT AND MOBILE ROBOT CHARGE STATION RETURN SYSTEM

(75) Inventors: Hyoung-deuk Im, Seoul (KR); Jong-il Park, Gupo-si (KR)

(73) Assignee: LG Electronics Inc., Seoul (KR)

( * ) Notice: Subject to any disclaimer, the term of this patent is extended or adjusted under 35 U.S.C. 154(b) by 6 days.

(21) Appl. No.: 11/553,533

(22) Filed: Oct. 27, 2006

(65) Prior Publication Data

US 2007/0096676 A1    May 3, 2007

(30) Foreign Application Priority Data

Oct. 28, 2005    (KR)    ............... 10-2005-0102517

(51) Int. Cl.
*G05B 19/10*    (2006.01)
*H02J 7/00*    (2006.01)

(52) U.S. Cl. ............ 318/568.12; 318/587; 318/568.11; 700/262; 700/245; 700/258

(58) Field of Classification Search ............... 318/587, 318/568.12; 700/245, 262; 320/149; 15/319
See application file for complete search history.

(56) References Cited

U.S. PATENT DOCUMENTS

| | | | | |
|---|---|---|---|---|
| 5,179,329 | A * | 1/1993 | Nishikawa et al. | 318/587 |
| 5,220,263 | A * | 6/1993 | Onishi et al. | 318/587 |
| 5,488,277 | A * | 1/1996 | Nishikawa et al. | 318/587 |
| 5,568,030 | A * | 10/1996 | Nishikawa et al. | 318/587 |
| 5,995,884 | A * | 11/1999 | Allen et al. | 701/24 |
| 6,389,329 | B1 * | 5/2002 | Colens | 700/262 |
| 6,532,404 | B2 * | 3/2003 | Colens | 700/262 |
| 6,711,280 | B2 * | 3/2004 | Stafsudd et al. | 382/106 |
| 6,781,338 | B2 * | 8/2004 | Jones et al. | 318/567 |
| 7,053,578 | B2 * | 5/2006 | Diehl et al. | 318/568.12 |
| 7,055,210 | B2 * | 6/2006 | Keppler et al. | 15/319 |
| 7,133,746 | B2 * | 11/2006 | Abramson et al. | 700/259 |
| 7,274,166 | B2 * | 9/2007 | Kim | 318/568.12 |
| 7,332,890 | B2 * | 2/2008 | Cohen et al. | 320/109 |
| 2002/0120364 | A1 * | 8/2002 | Colens | 700/262 |
| 2005/0010330 | A1 * | 1/2005 | Abramson et al. | 700/245 |
| 2005/0134209 | A1 | 6/2005 | Kim | |
| 2005/0137748 | A1 * | 6/2005 | Kim | 700/245 |

(Continued)

OTHER PUBLICATIONS

U.S. Appl. No. 11/553,224 to Kim et al., which was filed on Oct. 26, 2006.

(Continued)

*Primary Examiner*—Paul Ip
(74) *Attorney, Agent, or Firm*—Greenblum & Bernstein, P.L.C.

(57) ABSTRACT

Disclosed are a mobile robot and a mobile robot charge station return system, the mobile robot having a simplified structure by commonly using a detection sensor capable of both receiving charge station guide signals and obstacle detection signals, the two types of signals having different frequencies. The mobile robot includes a signal reception unit including one or more detection sensors for both receiving obstacle detection signals of different frequency bands and the charge station position guide signals outputted from a charge station; and a controller for separating and detecting the obstacle detection signals and the charge station position guide signals, which are outputted from the signal reception unit, according to frequency bands, and controlling an operation of the mobile robot according to the detected signals.

21 Claims, 4 Drawing Sheets

U.S. PATENT DOCUMENTS

| | | | |
|---|---|---|---|
| 2005/0156562 A1* | 7/2005 | Cohen et al. | 320/107 |
| 2005/0166352 A1* | 8/2005 | Keppler et al. | 15/319 |
| 2007/0021869 A1* | 1/2007 | Baek et al. | 700/245 |
| 2007/0096675 A1* | 5/2007 | Kim et al. | 318/587 |
| 2007/0096676 A1* | 5/2007 | Im et al. | 318/587 |
| 2007/0114975 A1* | 5/2007 | Cohen et al. | 320/149 |
| 2007/0233319 A1* | 10/2007 | Im et al. | 700/245 |

OTHER PUBLICATIONS

U.S. Appl. No. 11/553,289 to Im et al., which was filed on Oct. 26, 2006.

* cited by examiner

MOBILE ROBOT AND MOBILE ROBOT CHARGE STATION RETURN SYSTEM

CROSS-REFERENCE TO RELATED APPLICATIONS

This application claims benefit under 35 U.S.C. § 119 from Korean Patent Application No. 2005-0102517, filed on Oct. 28, 2005, the entire content of which is incorporated herein by reference.

BACKGROUND OF THE INVENTION

1. Field of the Invention

The present invention relates to a mobile robot, and more particularly, to a mobile robot and a mobile robot charge station return system, the mobile robot having a simplified structure by commonly using a detection sensor capable of both receiving charge station guide signals and obstacle detection signals, the two types of signals having different frequencies.

2. Description of the Related Art

Robots have been developed for industrial purposes, which have been used for factory automatization, or for gathering or collecting information in a limited environment in which persons is unbearable, in stead of persons. Recently, such a robot engineering field has been increasingly developed through the use in the most up-to-date space development industry, which results in development of a human-friendly home robot. The representative example of such a human-friendly home robot is a cleaning robot.

A cleaning robot, which belongs to a mobile robot, is an apparatus inhaling dust or foreign substance while traveling a certain cleaning area such as a house and an office. Such a cleaning robot includes travel means having right and left wheel motors for moving the corresponding cleaning robot, a plurality of sensors for detecting obstacles so that it can move without collision with various obstacles within a cleaning area, a controller for generally controlling the cleaning robot, etc., in addition to elements of a general vacuum cleaner inhaling dust or foreign substance.

A mobile robot has an automatic charge function because it carries out its own duties while moving a predetermined area. That is, the mobile robot automatically returns to a chare station installed in a predetermined position within the area and charges its own battery when it checks the battery level by itself and the battery level does not reach a reference value. After charging the battery, the mobile robot carries out its own duties again.

According to the prior art, in order to cause the mobile robot to automatically return to a chare station, a method has been used, which randomly moving the mobile robot along the wall surface of the area, and causing the mobile robot to return to the chare station when an artificial mark attached to the chare station is detected.

However, since such a method randomly moves the mobile robot along a wall surface, time required for returning to a chare station changes depending on areas in which the mobile robot is located. Further, according to this method, when the artificial mark attached to the chare station is detected late, the operation of the mobile robot may be stopped due to the consumption of the battery thereof.

According to another method for automatically causing a mobile robot to return to a chare station, signal emission means for emitting infrared rays or supersonic waves is installed in the chare station, and the mobile robot is allowed to return to the chare station when the infrared rays or supersonic waves emitted from the signal emission means are detected.

To this end, a chare station position detection sensor for detecting signals guiding the position of the chare station must be installed in the mobile robot, and an obstacle detection sensor for detecting obstacles existing in the movement area of the mobile robot must be separately installed therein, which results in difficulties in design of the mobile robot due to increase in the number of detection sensors, the ensuring of a space for installing the sensors, etc.

SUMMARY OF THE INVENTION

Accordingly, it is an object of the present invention provide an apparatus and a mobile robot and a mobile robot charge station return system, the mobile robot having a simplified structure by commonly using a detection sensor capable of receiving charge station guide signals and obstacle detection signals, the two types of signals having different frequencies.

In accordance with one aspect of the present invention, there is provided a method for mobile robot including: a signal reception unit including one or more detection sensors for both receiving obstacle detection signals of different frequency bands and the charge station position guide signals outputted from a charge station; and a controller for separating and detecting the obstacle detection signals and the charge station position guide signals, which are outputted from the signal reception unit, according to frequency bands, and controlling an operation of the mobile robot according to the detected signals.

In accordance with one aspect of the present invention, there is provided a mobile robot charge station return system for causing a mobile robot to return to a charge station, the system including: the charge station including one or more guide signal output means for outputting charge station position guide signals of different frequencies to respective preset areas; and the mobile robot including both a signal reception unit having one or more detection sensors for receiving obstacle detection signals of different frequency bands and the charge station position guide signals outputted from the charge station, and a controller for separating and detecting the obstacle detection signals and the charge station position guide signals, which are outputted from the signal reception unit, according to frequency bands, and controlling an operation of the mobile robot according to the detected signals.

According to a mobile robot and a mobile robot charge station return system of the present invention, the mobile robot has a plurality of detection sensors capable of both receiving obstacle detection signals and charge station position guide signals, and classifies and processes the obstacle detection signals and the charge station position guide signals by using the frequency of received signals, so that it is possible to travel while avoiding obstacles and to effectively return to a charge station.

Further, with the common use of a detection sensor for detecting the obstacle detection signals and the charge station position guide signals, only a program performing charge station return processing is provided without change in the structure of an existing cleaning robot, so that it is possible to effectively return to the charge station.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

The present invention now will be described more fully hereinafter with reference to the accompanying drawings, in which embodiments of the invention are shown.

Figure 1:
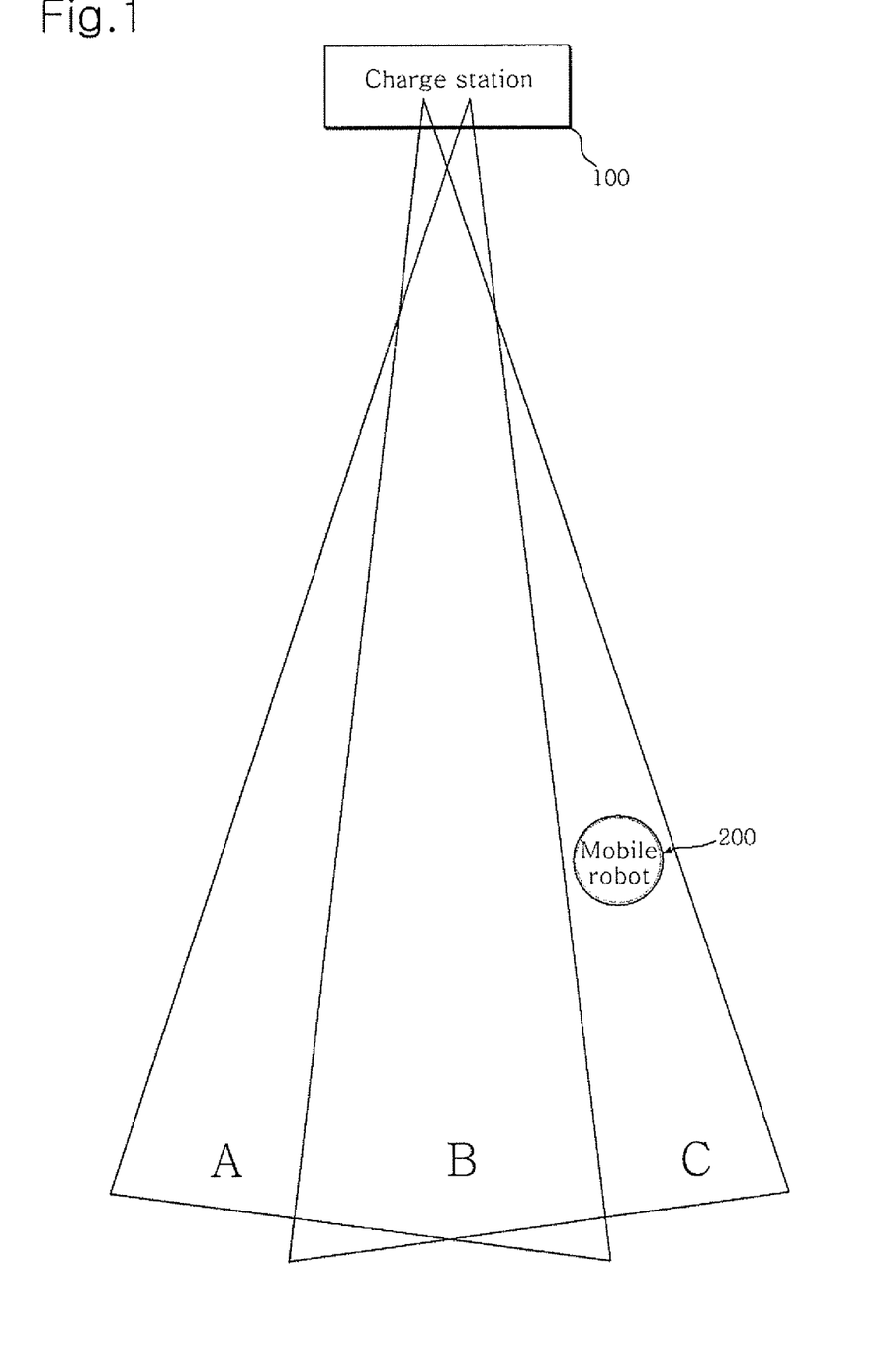
FIG. 1 is a diagram schematically showing a mobile robot charge station return system according to one preferred embodiment of the present invention.

FIG. 1 is a diagram schematically showing a mobile robot charge station return system according to one preferred embodiment of the present invention. As shown in FIG. 1, the mobile robot charge station return system according to the present invention includes a charge station 100 and a mobile robot 200. The charge station 100 includes one or more guide signal emission means for emitting charge station position guide signals having different frequencies to respective preset areas, and the mobile robot 200 receives the charge station position guide signals emitted from the charge station 100 so as to calculate the location information of the charge station 100, and returns to the charge station 100 according to the calculated location information.

The charge station 100 includes a plurality of infrared emitters (guide signal emission means). For example, when an available frequency has a range of 400 to 500 Hz, infrared rays having a frequency of 400 Hz are emitted to the right area C with respect to the charge station 100, infrared rays having a frequency of 500 Hz are emitted to the left area A with respect to the charge station 100, and the two types of infrared rays are overlappingly emitted to the central area B with respect to the charge station 100.

If the mobile robot 200 detects the battery level while carrying out its own duties and determines that it is necessary to charge the battery thereof, the mobile robot 200 returns to the charge station 100 according to a charge station return algorithm using the received charge station position guide signals. If the mobile robot 200 is docked, the charge station 100 supplies power to charge the battery of the mobile robot 200. If the charge is completed, the mobile robot 200 leaves the charge station 100 and carries out its own duties again.

The representative example of a commercialized mobile robot is a cleaning robot 200. The cleaning robot 200 is the mobile robot 200 inhaling dust or foreign substance while freely moving a predetermined area.

Hereinafter, the mobile robot 200 according to the present invention will be described in detail with reference to FIG. 2.

Figure 2:
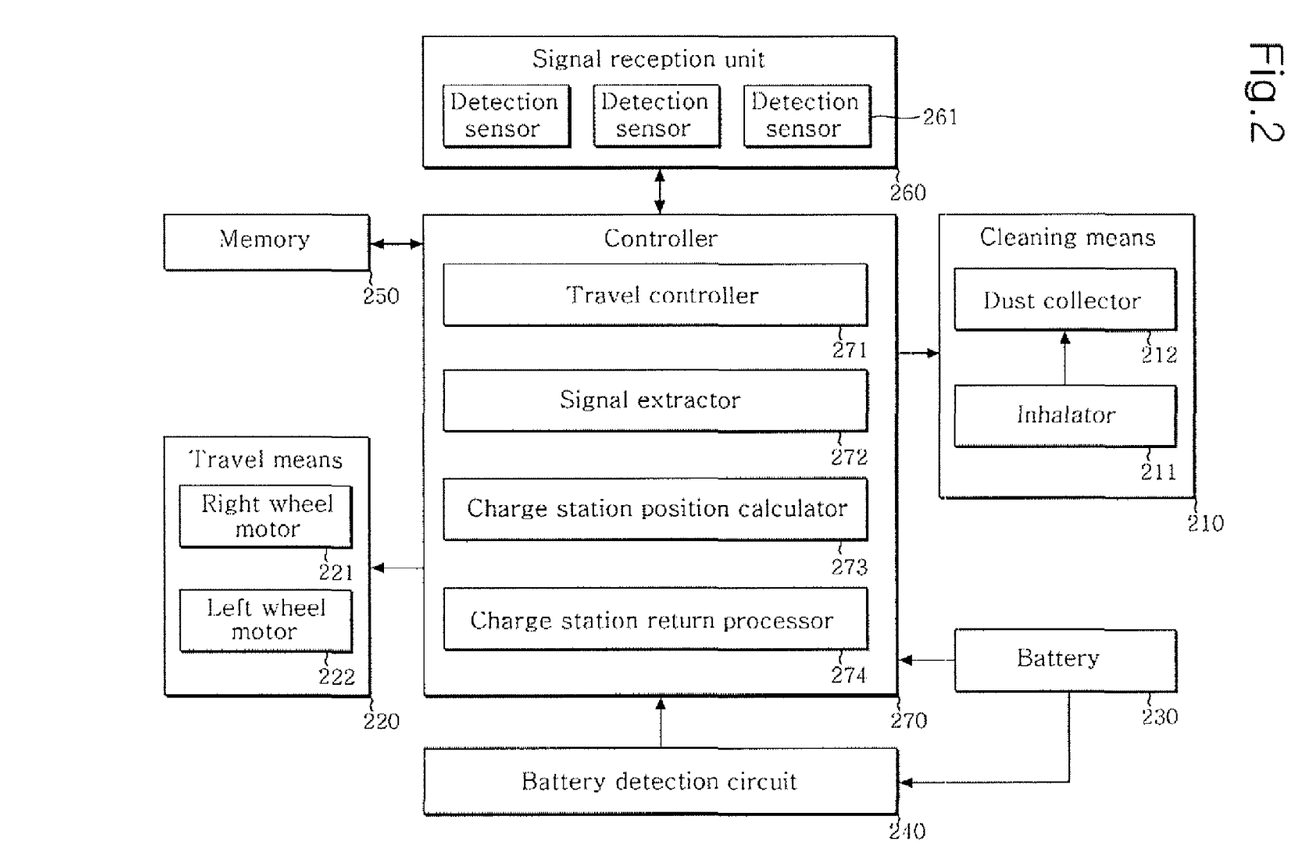
FIG. 2 is a block diagram schematically showing a cleaning robot (a kind of mobile robot) according to one preferred embodiment of the present invention.

FIG. 2 is a block diagram schematically showing a cleaning robot (a kind of mobile robot) according to one preferred embodiment of the present invention. As shown in FIG. 2, the cleaning robot 200 includes a dust detection sensor (not shown), an inhalator 211, cleaning means 210, travel means 220, a battery 230, a battery detection circuit 240, and a memory 250. The dust detection sensor detects dust or foreign substance within a cleaning area, the inhalator 211 inhales the dust or foreign substance detected by the dust detection sensor, and the cleaning means 210 includes a dust collector 212 for collecting the dust or foreign substance inhaled by the inhalator 211. The travel means 220 moves the cleaning robot 200, and the battery 230 supplies power to the cleaning means 210 and the travel means 220. The battery detection circuit 240 checks the battery level of the battery 230 at regular intervals, and outputs battery charge request signals when the battery level is less than a predetermined reference value. The memory 250 stores an operation program of the cleaning robot 200, and stores the location information of the charge station 100 calculated from charge station position guide signals.

Further, the cleaning robot 200 includes a signal reception unit 260 and a controller 270. The signal reception unit 260 includes one or more detection sensors 261 for receiving obstacle detection signals and charge station position guide signals having different frequencies. The controller 270 determines the position of the charge station 100 by using the charge station position guide signals received through the signal reception unit 260 according to the battery charge request signals outputted from the battery detection circuit 240, and outputs control signals to the travel means 220 in order to cause the cleaning robot 200 to return to the charge station 100.

From among the elements of the cleaning robot 200, since the cleaning means 210 and the battery 230 are well known, details will be omitted.

The battery detection circuit 240 divides a voltage applied from the battery 230 at a predetermined resistance ratio, and outputs the divided detection voltage to the controller 270. The controller 270 displays the level of the battery 230 by using a bar according to the level of the detection voltage outputted from the battery detection circuit 240. Further, the battery detection circuit 240 compares the voltage measured from the battery 230 with reference voltage stored in the memory 250, and outputs charge request signals to the controller 270 when the measured voltage does not reach the reference voltage.

For example, the memory 250 may be constructed as a non-volatile memory element such as an EEPROM and a flash memory, which stores an operation program for operating the cleaning robot 200. Further, the memory 250 stores the location information of the charge station 100 calculated from the charge station position guide signals emitted from the charge station 100. The controller 270 accesses both the operation program and the location information stored in the memory 250.

For example, the signal reception unit 260 includes one or more infrared sensors for detecting obstacles existing in the movement area of the cleaning robot 200. The infrared sensor includes both a light-emitting element for emitting infrared rays and a light-receiving element for receiving light reflected from the obstacles. The signal reception unit 260 determines if obstacles exist by using the reflected light received in the light-receiving element, measures input time of the reflected light to the light-receiving element after the infrared rays emitted from the light-emitting element are reflected from the obstacles, and calculates a distance with the obstacles.

In the cleaning robot 200 according to the characteristics of the present invention, light-receiving elements are not separately provided in order to receive the obstacle detection signals and the charge station position guide signals. That is, one light-receiving element is used in order to receive the obstacle detection signals and the charge station position guide signals. Accordingly, the signal reception unit 260 can receive both the infrared signals, which are the charge station position guide signals outputted from the charge station 100, and the detection signals reflected by the obstacles. The received obstacle detection signals and charge station position guide signals are outputted to and processed by the controller 270. Signal processing by the controller 270 will be described in detail later.

The travel means 220 drives a right wheel motor 221 and a left wheel motor 222 according to the control signals outputted from the controller 270, thereby moving the cleaning robot 200. The right wheel motor 221 and the left wheel motor 222 are linked to a right wheel and a left wheel for moving the cleaning robot 200, respectively. Accordingly, the cleaning robot 200 moves in all directions according to the rotation speeds and directions of the right wheel motor 221 and the left wheel motor 222.

The controller 270 generally controls the cleaning robot 200, receives both the obstacle detection signals and the charge station position guide signals outputted from the signal reception unit 260, classifies the two types of signals according to characteristics thereof, and controls the operation of the cleaning robot 200 with reference to the classified signals.

The controller 270 includes a travel controller 271 for controlling the travel means 220, a signal extractor 272, a charge station position calculator 273, and a charge station return processor 274. The signal extractor 272 classifies the obstacle detection and the charge station position guide signals outputted from the signal reception unit 260, which have different frequencies, and outputs the classified signals. The charge station position calculator 273 calculates the position of the charge station 100 by using the charge station position guide signals outputted from the signal extractor 272. The charge station return processor 274 outputs the control signals to the travel controller 271 in order to cause the cleaning robot 200 to return to the charge station 100 with reference to the charge station position information outputted from the charge station position calculator 273.

The travel controller 271 controls the travel means 220 for moving the cleaning robot 200 according to control commands based on the operation program of the cleaning robot 200.

The signal extractor 272 receives the obstacle detection signals or the charge station position guide signals from the signal reception unit 260, classifies the received signals according to respective frequency bands, and selectively outputs the classified signals. For example, when the obstacle detection signals use a frequency band of A to B Hz and the charge station position guide signals are infrared signals using a frequency band of C to D Hz, if the battery charge request signals are inputted from the battery detection circuit 240, the signal extractor 272 extracts signals having the frequency band of C to D Hz from the signals outputted from the signal reception unit 260, and outputs the extracted signals to the charge station position calculator 273. Further, the signal extractor 272 extracts docking-possible area signals, which are received only in an area where the cleaning robot 200 can be docked to the charge station, and outputs the extracted docking-possible area signals to the charge station position calculator 273.

In addition, the signal extractor 272 checks identification information of the detection sensor 261, in which the charge station position guide signals are received, from among the multiple detection sensors 261 provided in the cleaning robot 200, and outputs corresponding identification information the charge station position calculator 273. That is, each of the detection sensors 261 has unique identification information according to locations in which the detection sensors 261 are installed in the cleaning robot 200. Accordingly, the signal extractor 272 can confirm the detection sensor 261 through such identification information, the detection sensor 261 having received the charge station position guide signals.

The charge station position calculator 273 analyzes the frequency of the charge station position guide signals outputted from the signal extractor 272, determines a direction in which the corresponding cleaning robot 200 is located with respect to the charge station 100, and outputs the determination results to the charge station return processor 274.

As described above, the multiple infrared emitters are provided in the charge station 100, and each of the infrared emitters outputs charge station position guide signals having different frequencies to each area. For example, as shown in FIG. 1, when an available frequency has a range of 400 to 500 Hz, infrared rays having a frequency of 400 Hz are emitted to the right area C with respect to the charge station 100, infrared rays having a frequency of 500 Hz are emitted to the left area A with respect to the charge station 100, and the two types of infrared rays are overlappingly emitted to the central area B with respect to the charge station 100.

That is, when the infrared rays having a frequency of 400 Hz are received, the charge station position calculator 273 informs the charge station return processor 274 that the cleaning robot 200 is currently located in the right area with respect to the charge station 100.

Further, when the infrared rays having a frequency of 300 Hz are received, the charge station position calculator 273 informs the charge station return processor 274 that the cleaning robot 200 is currently located in the left area with respect to the charge station 100.

Accordingly, the charge station position calculator 273 confirms the frequency of the charge station position guide signals outputted from the signal extractor 272, thereby determining an area in which the cleaning robot 200 is currently located with respect to the charge station 100, and outputting the determination results to the charge station return processor 274.

Further, the charge station position calculator 273 calculates a direction in which the charge station 100 is located by using the identification information of the detection sensor 261 outputted from the signal extractor 272, and outputs the calculation results to the charge station return processor 274. For example, in a case where the detection sensors 261 are respectively provided in the front/back/left/right of the charge station 100, when guide signals are received from the detection sensor 261 provided in the left side of the charge station 100, the charge station position calculator 273 can recognize that the charge station 100 is located in the left side of the movement direction of the cleaning robot 200 by using the identification information of the corresponding detection sensor 261, and outputs the recognition results to the charge station return processor 274.

The charge station return processor 274 receives the charge station position information, which is outputted from the charge station position calculator 273, according to the battery charge request outputted from the battery detection circuit 240, and stores the received charge station position information in the memory 250. Further, the charge station return processor 274 outputs control signals to the travel controller 271 for traveling of the cleaning robot 200 according to corresponding position information.

If the docking-possible area signals are received from the signal extractor 272, the charge station return processor 274 outputs control signals to the travel controller 271 so that the cleaning robot 200 is docked to the charge station 100 according to the docking algorithm of the operation program stored in the memory 250. Since the charge station docking algorithm has been well known, details will be omitted.

Figure 3:
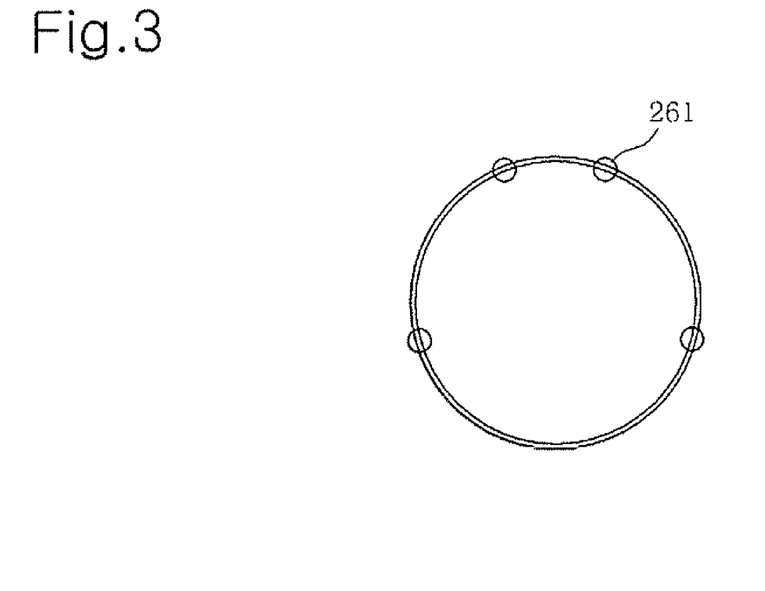
FIG. 3 is a diagram schematically showing an example in which the detection sensors shown in FIG. 2 are mounted.

FIG. 3 is a diagram schematically showing an example in which the detection sensors are mounted on the cleaning robot. As shown in FIG. 3, the detection sensors 261 of the cleaning robot 200 according to the present invention have unique identification information, respectively, which are spaced apart from one another at predetermined intervals along the side of the cleaning robot 200. Each of the detection sensors 261 includes both a light-emitting element for emitting infrared rays in order to detect obstacles and a light-receiving element for receiving infrared rays reflected from obstacles. According to the present invention, the light-receiving element also receives the charge station position guide signals outputted from the charge station 100, and outputs the received charge station position guide signals to the signal extractor 272.

The signal extractor 272 receives the obstacle detection signals or the charge station position guide signals through the light-receiving element, classifies the received signals according to respective frequency bands. The charge station position calculator 273 calculates the position of the charge station 100 by using the identification information of the detection sensor 261, in which the charge station position guide signals are received, from among the multiple detection sensors 261, and outputs information about the calculated position to the charge station return processor 274.

Figure 4:
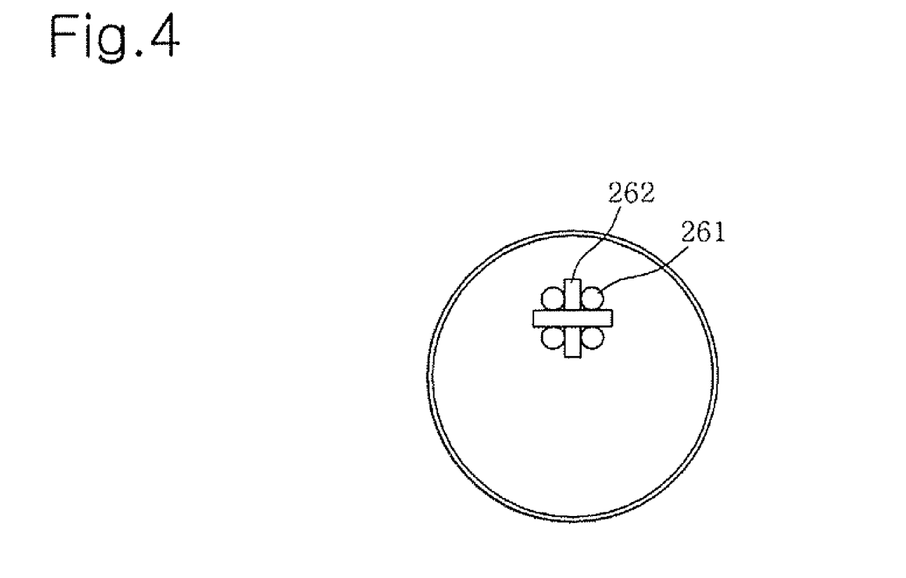
FIG. 4 is a diagram schematically showing another example in which the detection sensors shown in FIG. 2 are mounted.

Consequently, only software performing charge station return processing is provided without change in the structure of the cleaning robot 200, so that it is possible to effectively return to the charge station FIG. 4 is a diagram schematically showing another example in which the detection sensors are mounted on the cleaning robot. As shown in FIG. 4, the detection sensors 261 of the cleaning robot 200 according to the present invention have unique identification information, respectively, which are separately installed by partitions 262 on the front upper surface of the cleaning robot 200 in order to detect signals transmitted from different directions.

FIG. 4 shows an example in which four detection sensors have been installed. The detection sensors 261 are separated by the partitions 262, receive signals transmitted from four areas, and output the received signals to the signal extractor 272. The signal extractor 272 classifies the received obstacle detection signals or charge station position guide signals according to respective frequency bands. The charge station position calculator 273 calculates the position of the charge station 100 by using the identification information of the detection sensor 261, in which the charge station position guide signals are received, from among the multiple detection sensors 261, and outputs information about the calculated position to the charge station return processor 274.

Figure 5:
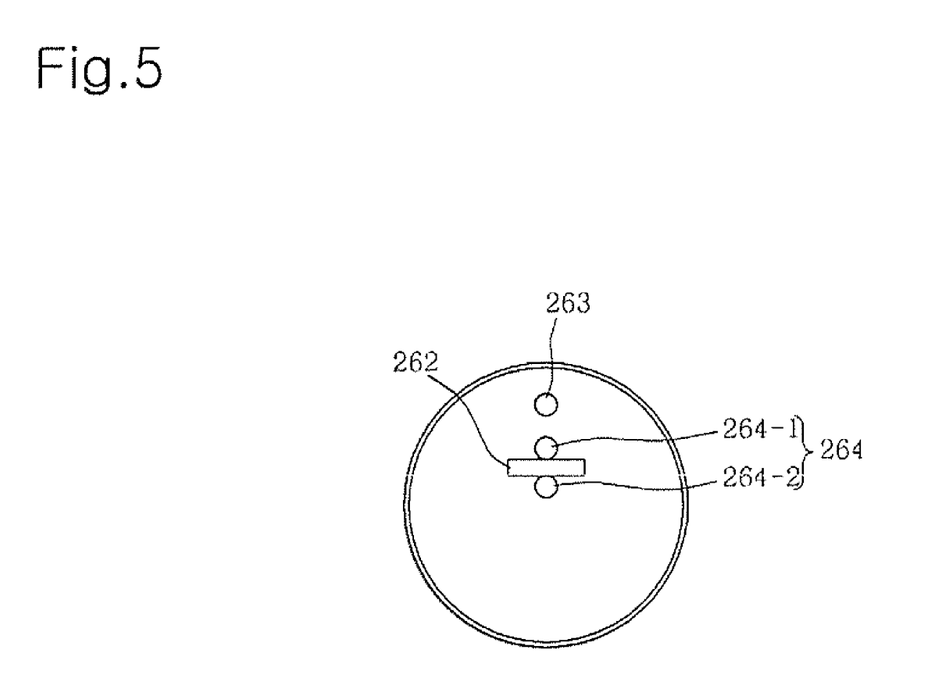
FIG. 5 is a diagram schematically showing further another example in which the detection sensors shown in FIG. 2 are mounted.

FIG. 5 is a diagram schematically showing further another example in which the detection sensors are mounted on the cleaning robot. As shown in FIG. 5, the signal reception unit 260 of the cleaning robot 200 according to the present invention includes a space detection sensor 263 and a direction detection sensor 264. The space detection sensor 263 receives charge station position guide signals of different frequencies spatially outputted from the charge station 100, and the direction detection sensor 264 detects the reception direction of the charge station position guide signals.

The space detection sensor 263 includes only a light-receiving element for receiving the charge station position guide signals outputted from the charge station 100, and receives the charge station position guide signals of different frequencies, which are outputted to respective preset areas as shown in FIG. 1. Accordingly, the charge station position calculator 273 calculates a space on which the corresponding cleaning robot 200 is currently located with respect to the charge station 100 by using the frequency band of the received charge station position guide signals, and outputs the calculated space to the charge station return processor 274.

The direction detection sensor 264 detects a direction in which the charge station position guide signals outputted from the charge station 100 are received. For example, the direction detection sensor 264 may include a forward detection sensor 264-1 and a backward detection sensor 264-2. The forward detection sensor 264-1 detects charge station position guide signals transmitted from the front of the cleaning robot 200, and the backward detection sensor 264-2 detects charge station position guide signals transmitted from the back of the cleaning robot 200.

When charge station position guide signals are received from the front of the movement direction of the cleaning robot 200, the forward detection sensor 264-1 outputs predetermined detection signals to the charge station position calculator 273. When charge station position guide signals are received from the back of the movement direction of the cleaning robot 200, the forward detection sensor 264-2 outputs predetermined detection signals to the charge station position calculator 273.

The charge station position calculator 273 calculates information about a position in which the cleaning robot 200 is being located with respect to the charge station 100 by using the frequency band of the charge station position guide signals outputted from the space detection sensor 263, and calculates a return movement direction to the charge station 100 by using the detection signals outputted from the direction detection sensor 264.

As described above, a mobile robot according to the present invention has a plurality of detection sensors capable of both receiving obstacle detection signals and charge station position guide signals, and classifies and processes the obstacle detection signals and the charge station position guide signals by using the frequency of received signals, so that it is possible to travel while avoiding obstacles and to effectively return to a charge station.

Further, with the common use of a detection sensor for detecting the obstacle detection signals and the charge station position guide signals, only a program performing charge station return processing is provided without change in the structure of an existing cleaning robot, so that it is possible to effectively return to the charge station.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A mobile robot comprising:
   a signal reception unit including one or more detection sensors that receive obstacle detection signals and charge station position guide signals outputted from a charge station; and
   a controller which classifies a signal received by the signal reception unit as either an obstacle detection signal or a charge station position guide signal based on a frequency of the received signal, outputs the received signal based on its classification, and controls an operation of the mobile robot based on the received signal.

2. The mobile robot as claimed in claim 1, further comprising a battery detection circuit that detects a battery level of a battery supplying power at regular intervals, and outputs battery charge request signals when the detected battery level is less than a predetermined reference value.

3. The mobile robot as claimed in claim 2, wherein the controller detects charge station position guide signals which are outputted from the signal reception unit in response to the battery charge request signals outputted from the battery detection circuit, and controls the mobile robot to return to the charge station by using the detected charge station position guide signals.

4. The mobile robot as claimed in claim 1, wherein the controller comprises:
   a travel controller that controls a movement of the mobile robot;
   a charge station position calculator that calculates a position of the charge station by using a charge station position guide signal received by the signal reception unit; and a charge station return processor that outputs control signals to the travel controller in order to cause the mobile robot to return to the charge station with reference to charge station position information outputted from the charge station position calculator.

5. The mobile robot as claimed in claim 1, wherein the detection sensors of the signal reception unit are spaced apart at predetermined intervals along a side of the mobile robot, and unique identification information is associated with each of the detection sensors.

6. The mobile robot as claimed in claim 5, wherein the controller determines a position of the charge station by using the identification information of a detection sensor of the one or more detection sensors which received a charge station position guide signal.

7. The mobile robot as claimed in claim 1, wherein the detection sensors of the signal reception unit are installed on a front upper surface of the mobile robot and are separated by partitions to detect signals from different directions, and unique identification information is associated with each of the detection sensors.

8. The mobile robot as claimed in claim 7, wherein the controller determines a position of the charge station by using the identification information of a detection sensor of the one or more detection sensors which received a charge station position guide signal.

9. The mobile robot as claimed in claim 1, wherein the signal reception unit comprises:
a space detection sensor that receives charge station position guide signals of different frequencies outputted to respective preset areas from the charge station; and
a direction detection sensor that detects a direction in which the charge station position guide signals are received.

10. The mobile robot as claimed in claim 9, wherein the controller determines a position of the mobile robot from a center of the charge station by using a frequency of the charge station position guide signals detected through the space detection sensor, and determines a return movement direction to the charge station by using the direction detection sensor.

11. The mobile robot as claimed in claim 9, wherein the direction detection sensor comprises:
a forward detection sensor that detects charge station position guide signals at a front of the cleaning robot; and
a backward detection sensor that detects charge station position guide signals at a back of the cleaning robot.

12. The mobile robot as claimed in claim 1, wherein the mobile robot comprises a cleaning robot.

13. A mobile robot charge station return system for causing a mobile robot to return to a charge station, the system comprising:
the charge station, which includes a plurality of guide signal emitters that output charge station position guide signals of different frequencies to respective preset areas; and
the mobile robot, which includes a signal reception unit having one or more detection sensors that receive obstacle detection signals and the charge station position guide signals of outputted from the charge station, and a controller which classifies a signal received by the signal reception unit as either an obstacle detection signal or a charge station position guide signal based on a frequency of the received signal, outputs the received signal based on its classification, and controls an operation of the mobile robot based on the received signal.

14. The system as claimed in claim 13, wherein the signal reception unit of the mobile robot comprises:
a space detection sensor that receives the charge station position guide signals outputted to respective preset areas from the charge station; and
a direction detection sensor that detects a direction in which the charge station position guide signals are received.

15. The system as claimed in claim 14, wherein the controller of the mobile robot determines a position of the mobile robot from a center of the charge station by using a frequency of the charge station position guide signals detected through the space detection sensor, and determines a return movement direction to the charge station by using the direction detection sensor.

16. The system as claimed in claim 14, wherein the direction detection sensor comprises:
a forward detection sensor that detects charge station position guide signals at a front of the cleaning robot; and
a backward detection sensor that detects charge station position guide signals at a back of the cleaning robot.

17. The system as claimed in claim 13, wherein the mobile robot further comprises a battery detection circuit that detects a battery level of a battery supplying power at regular intervals, and outputs battery charge request signals when the detected battery level is less than a predetermined reference value.

18. The system as claimed in claim 17, wherein the controller detects charge station position guide signals which are outputted from the signal reception unit in response to the battery charge request signals outputted from the battery detection circuit, and controls the mobile robot to return to the charge station by using the detected charge station position guide signals.

19. The system as claimed in claim 13, wherein the controller of the mobile robot comprises:
a travel controller that controls a movement of the mobile robot;
a charge station position calculator that calculates a position of the charge station by using a charge station position guide signal received by the signal reception unit; and
a charge station return processor that outputs control signals to the travel controller in order to cause the mobile robot to return to the charge station with reference to charge station position information outputted from the charge station position calculator.

20. The system as claimed in claim 13, wherein the mobile robot comprises a cleaning robot.

21. A method of controlling a mobile robot, comprising:
receiving a signal with a signal reception unit of the mobile robot;
classifying the signal as either an obstacle detection signal or a charge station position guide signal based on a frequency of the received signal;
outputting the signal based on its classification; and
controlling an operation of the mobile robot based on the signal.

* * * * *

UNITED STATES PATENT AND TRADEMARK OFFICE
CERTIFICATE OF CORRECTION

PATENT NO.       : 7,397,213 B2                                        Page 1 of 1
APPLICATION NO.  : 11/553533
DATED            : July 8, 2008
INVENTOR(S)      : H. Im et al.

It is certified that error appears in the above-identified patent and that said Letters Patent is hereby corrected as shown below:

At column 9, line 59 (claim 13, line 11) of the printed patent, after "signals", delete "of".

Signed and Sealed this

Seventeenth Day of February, 2009

JOHN DOLL
*Acting Director of the United States Patent and Trademark Office*